(No Model.) 2 Sheets—Sheet 1.
F. A. HETHERINGTON.
PHOTOGRAPHIC CAMERA.
No. 502,857. Patented Aug. 8, 1893.
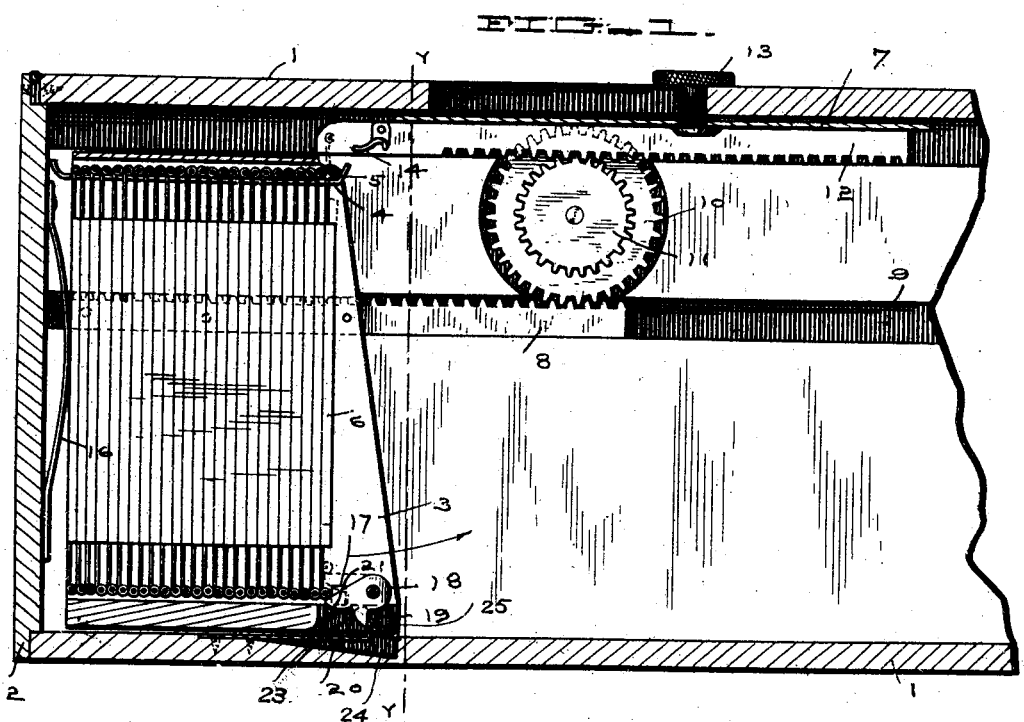
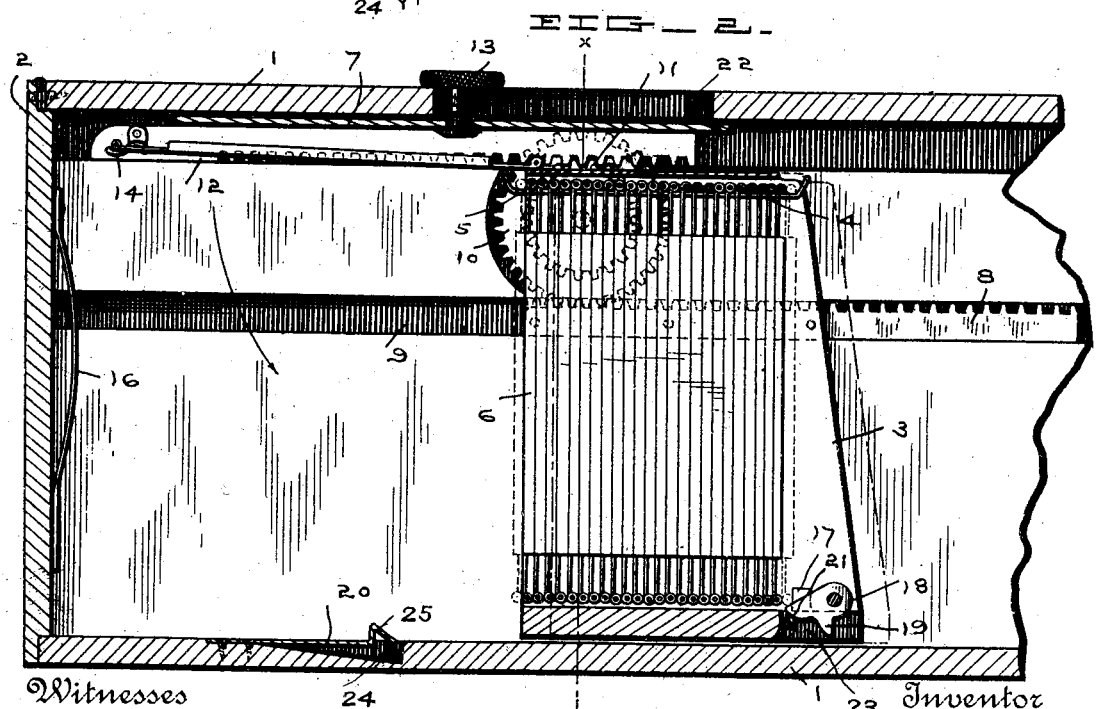
Witnesses
H. T. Nealy
C. P. Griffith
Inventor
Frederick A. Hetherington
By Attorney
V. H. Lockwood (No Model.) 2 Sheets—Sheet 2.
F. A. HETHERINGTON.
PHOTOGRAPHIC CAMERA.
No. 502,857. Patented Aug. 8, 1893.
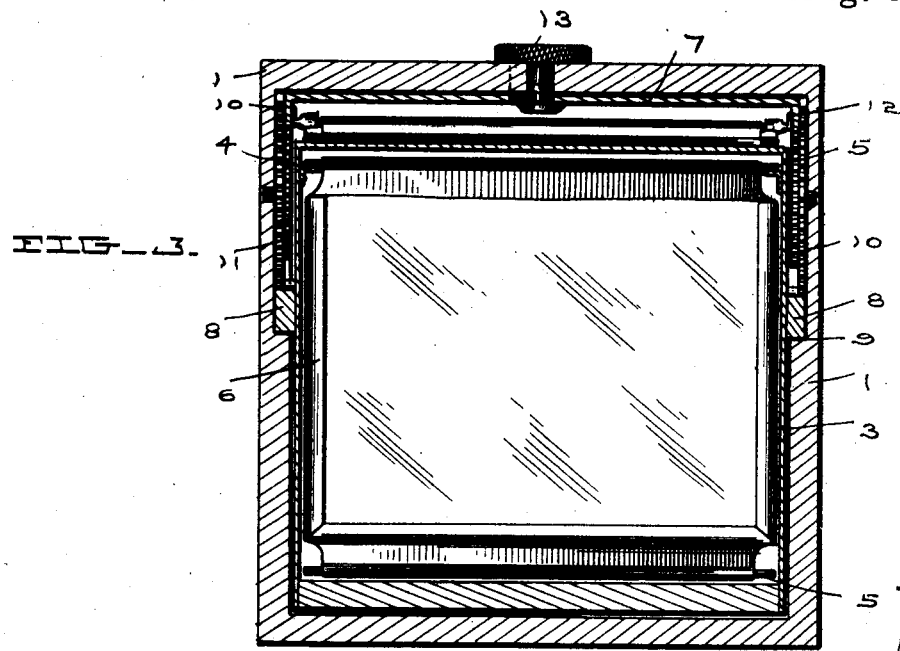
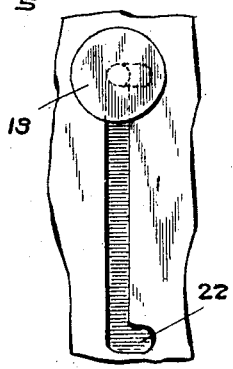
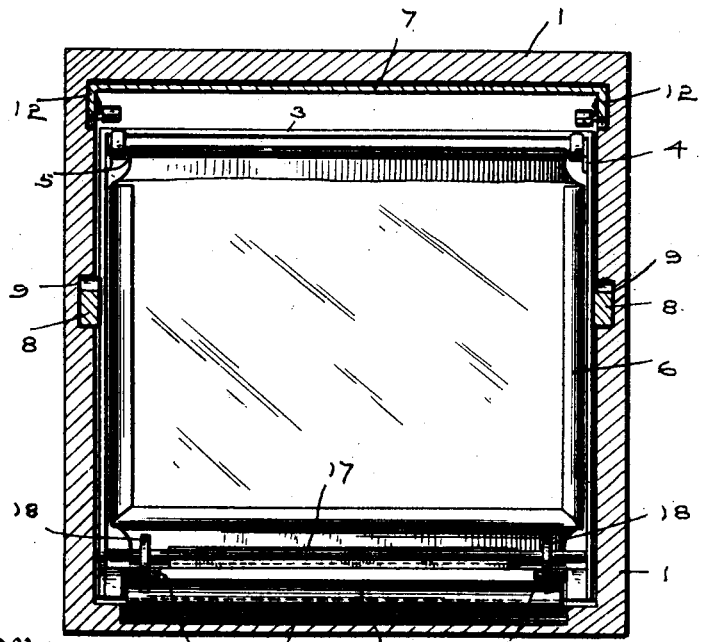
Witnesses
H. D. Nealy
E. B. Griffith
Inventor
Frederick A. Hetherington.
By Attorney V. H. Lockwood

UNITED STATES PATENT OFFICE.

FREDERICK A. HETHERINGTON, OF INDIANAPOLIS, INDIANA, ASSIGNOR TO THE UNITED STATES CAMERA COMPANY, OF SAME PLACE.

PHOTOGRAPHIC CAMERA.

SPECIFICATION forming part of Letters Patent No. 502,857, dated August 8, 1893.

Application filed October 17, 1892. Serial No. 449,059. (No model.)

*To all whom it may concern:*

Be it known that I, FREDERICK A. HETHERINGTON, of Indianapolis, county of Marion, and State of Indiana, have invented certain new and useful Improvements in Photographic Cameras; and I do hereby declare that the following is a full, clear, and exact description thereof, reference being had to the accompanying drawings, in which like figures refer to like parts.

My invention relates to new and useful improvements in photographic cameras, and more especially to that class which is known as magazine cameras, and its chief object is to provide means to remove the plates without exposure successively and replace them in the same order in the rear part of the magazine, and it will be understood from the following description.

In the drawings, Figure 1 is a longitudinal section of a part of a camera embodying my improvements, the forward carrier in the magazine in position to expose the plate therein. Fig. 2 is a similar view showing the forward plate in transit to the rear of the magazine after an exposure, the magazine itself not having quite completed its forward movement. Fig. 3 is a cross section on the line $x-x$, Fig. 2. Fig. 4 is a similar view on the line $y-y$, Fig. 1. Fig. 5 is a detail perspective of one of the spring brackets which engage the projections on the plate or film carriers for removing them to the rear of the magazine. Fig. 6 is a plan view of the slot in the top of the camera casing and the headed pin, part of the camera casing being broken away.

In detail, 1 represents a camera casing having a removable end 2, and 3 is an inner frame or magazine having on its inner sides the brackets 4 which form tracks upon which the projections 5 of the plate or film carriers 6 are adapted to engage and be thereby supported. The ends of the brackets 4 extend out at each end of the magazine, and are turned up to hold the carriers in place. The plate or film carriers which are illustrated in Figs. 3 and 4 are of any ordinary form. Either films or plates can be used in them with the same result, films, however, being shown, and the carriers have the projections 5 both at the upper and lower ends, the corners of the carriers being cut out so that the projections, while they project, do not extend beyond a line with the straight edges of the carriers.

To each side of the magazine 3, and supporting the same, are secured thin racks 8 which fit and work loosely in grooves 9 formed in the sides of the camera casing. These racks engage with pinions 10 pivoted to the sides of the casing 1 and working in a recess. 11 are smaller pinions secured to the face of each of the larger ones and adapted to rotate with them, the teeth of the smaller pinions engaging with the racks 12 working in grooves in the sides of the camera casing at the top, the two racks 12 being formed on a connecting plate 7. A knob or handle 13 works through a slot in the top of the casing, its lower end fitting in a short lateral slot in the plate 7 below, so that the plate and the racks 12 may be moved from without the camera, the plate connecting the racks serving to prevent the light from gaining an entrance through the slot into the interior.

22 is a detent or notch in the slot in which the knob or handle 13 is lodged when the magazine is moved to the rear, by slightly moving such knob laterally when it is at the end of its movement.

To one end of the racks 12 on the inside are secured spring catches or brackets 14 shown in detail in Fig. 5, for engaging with the projections 5 of the plate or film carriers when carrying them to the rear of the magazine after an exposure has been made, as will be hereinafter described.

To the rear wall of the camera casing 1, on each side, is secured a flat spring 16, and when the magazine with its carriers is drawn back into the position shown in Fig. 1, the springs will bear on the backs of the carriers, forcing them toward the front of the magazine, the plate or cross piece 17 being secured to the bottom of the magazine in front of the forward plate to prevent it from being thrown out of the magazine by the spring 16 and to hold it in a vertical position.

18 are fingers pivoted on a short shaft across the front of the magazine and on a line with the cross piece 17, the ends of these fingers lying below the forward carrier in the magazine and at the ends of the cross piece 17, a projection 19 being formed on the under sides of the fingers. This and the lower parts of the fingers normally lie in a recess 23 in the bottom of the magazine.

20 is a flat spring secured to the bottom of the camera casing, its forward end lying over a recess 24 in such casing, and having an upturned end 25, as shown in Figs. 1 and 2, this end or hook being adapted to engage with the projections 19 when the magazine is moved forward.

21 are pins secured in the sides of the magazine frame and extending laterally into the recess 23 in the bottom of the magazine and their function is to engage with the fingers 18 to prevent the hooks 25 on the springs 20 from moving the fingers when the magazine is brought back to its normal position in the rear part of the casing.

Having now mentioned all the parts of my device, I will proceed with its operation, which is as follows: Where all the carriers are loaded, and when the film or plate in the forward carrier has been exposed, to remove it and allow the next one to be operated upon, the handle or knob 13 is moved on the top of the casing 1 toward the rear, whereby the plate 7 with its two racks 12 will be moved in the same direction. This movement of the racks 12 will cause the double pinions 10 and 11 to turn, the racks 12 engaging with the smaller pinions, and the larger pinions engaging with the racks 8, which operate in the sides of the magazine. The magazine will then be moved forward, and the first result of the movement is to cause the ends of the fingers 18 to be raised up under the forward carrier through the engagement of the spring 20 with the projections 19 on such fingers. Upon the continued movement of the different parts the forward carrier will be lifted up into the position shown in dotted lines in Fig. 1, and at such times the projections 5 on the carriers will be in a line just above the lower ends of the spring brackets 14, and as the racks 12 move toward the rear of the camera, the spring brackets will engage with the projections 5, and the carrier with its film will be carried by the racks over the top of the magazine, which will continue to move forward as shown in Fig. 2. When it has not yet completed its movement, and when the lower end of the carrier, which is being moved, drops off the magazine, its lower projections 5 will engage with the hooks formed on the rear ends of the brackets 4 of the magazine. These holding the carrier more firmly than the spring brackets 14, the carrier will be drawn over the top of the brackets 14, which hold it by merely bearing frictionally with its sloping face upon the upper projections 5, and the carrier will swing down upon its lower projections 5 into position behind the plates which have not been exposed. The position of the carrier which has just been moved into this position is then the reverse of the rest, its face being toward the rear. At this point the magazine will have reached the limit of its forward movement, and upon moving the handle or knob 13 forward, the magazine will return to its normal position in the rear of the casing, and the springs 16 will bear against the frame of the rear carrier on each side, forcing all the carriers forward until the first unexposed film will be in the same position as the one just removed. The advantage of this construction and manner of changing the position of the carriers is such that there is very little space lost or wasted in the construction of the casing, the operation is simple and the change of carriers effective. It will be noticed that the carrier after it has been moved to the back of the magazine, is turned upside down and in a reverse position as compared with the others.

In using the films it is not necessary to have any means for retaining them in place, for they are light and will hold themselves in by friction, whereas with glass a light spring or clamp will answer the purpose of holding the plates in.

My arrangement of pinions and racks, whereby the series of film carriers and the carrier which is being shifted move simultaneously, but in opposite directions, and at varying speed, enables me to shift the carrier and yet use a camera only half as long as it otherwise would have to be.

What I claim as my invention, and desire to secure by Letters Patent, is the following:

1. In a magazine camera, reciprocating actuating racks mounted in the camera casing, actuated racks secured to the magazine frame, and pinions mounted on shafts in the camera casing and meshing with such racks, substantially as shown and described.

2. In a magazine camera, a reciprocating actuating rack, an actuated rack secured to the magazine frame, and two pinions of different sizes rigidly mounted on a shaft having bearings in the camera casing, the smaller of such pinions meshing with the actuating rack and the larger with the actuated rack, substantially as shown and described.

3. In a magazine camera, a magazine frame adapted to contain a series of plate carriers, hooks within the camera adapted to catch and hold the front plate carrier when it is moved forward, and means for moving the magazine frame and the hooks simultaneously in opposite directions, substantially as shown and described.

4. In a magazine camera, a reciprocating actuating rack, a hook on one end thereof adapted to engage and hold the forward plate carrier when it is moved forward, an actuated rack secured to the magazine and supported in a recess in the magazine casing, and two pinions of different sizes rigidly mounted on a shaft having bearings in the camera casing, the smaller of such pinions meshing with the actuating rack, and the larger one with the actuated rack, substantially as shown and described.

5. In a magazine camera, a reciprocating frame, brackets on the sides of such frame adapted to support a series of plate carriers and having up-turned ends, hooks within the camera adapted to catch and hold the forward plate carrier when it is moved forward, and means for moving the magazine frame and the hooks simultaneously in opposite directions, until the withdrawn plate carrier is caught by the rear up-turned ends of the brackets in the magazine frame and drawn off the hooks and deposited at the rear of the series of plate carriers, substantially as shown and described.

6. In a magazine camera, a magazine frame adapted to contain a series of plate carriers, hooks within the camera adapted to catch and hold the front plate carrier when it is moved forward, means for moving the magazine frame and the hooks simultaneously in opposite directions, a pivoted finger in the lower part of the magazine frame, with its point resting beneath the forward plate carrier, and a catch in the lower part of the camera casing adapted to engage such finger and raise it when the magazine frame is moved forward, substantially as shown and described.

7. In a magazine camera, a magazine frame containing a series of plate carriers, hooks within the camera adapted to catch and hold the front plate carrier when it is moved forward, means for moving the magazine frame and the hooks simultaneously in opposite directions, pivoted fingers in the lower front part of the magazine frame with their points resting normally beneath the forward plate carrier, lugs on the under sides of such fingers, a catch mounted in the lower part of the camera casing adapted when the magazine frame is moved forward to engage such lugs and lift such fingers, and pins in the magazine frame extending into a recess therein and adapted to engage such fingers on the return of the magazine frame and prevent such catch from operating such fingers during the return movement, substantially as shown and described.

8. In a magazine camera, a pair of actuating racks connected by a cross strip, a headed pin movably mounted on such cross strip and extending through a slot in the camera casing, in which it may be reciprocated, a notch at the forward end of such slot in which such headed pin is adapted to be lodged, pinions mounted rigidly on shafts having bearings in the camera casing, actuated racks secured to the magazine frame, such pinions meshing with the actuating racks above and the actuated racks below, means for preventing the plate carriers from being pushed forward out of the magazine frame and a spring at the rear of the camera casing adapted to bear against the rearmost plate carrier in the magazine frame, substantially as shown and described.

In witness whereof I have hereunto set my hand this 14th day of October, 1892.

FREDERICK A. HETHERINGTON.

Witnesses:
H. D. NEALY,
E. B. GRIFFITH.